D. S. STEWART.
FOUR WHEEL STEERING GEAR.
APPLICATION FILED JAN. 20, 1919.
1,323,653.
Patented Dec. 2, 1919.
2 SHEETS—SHEET 1
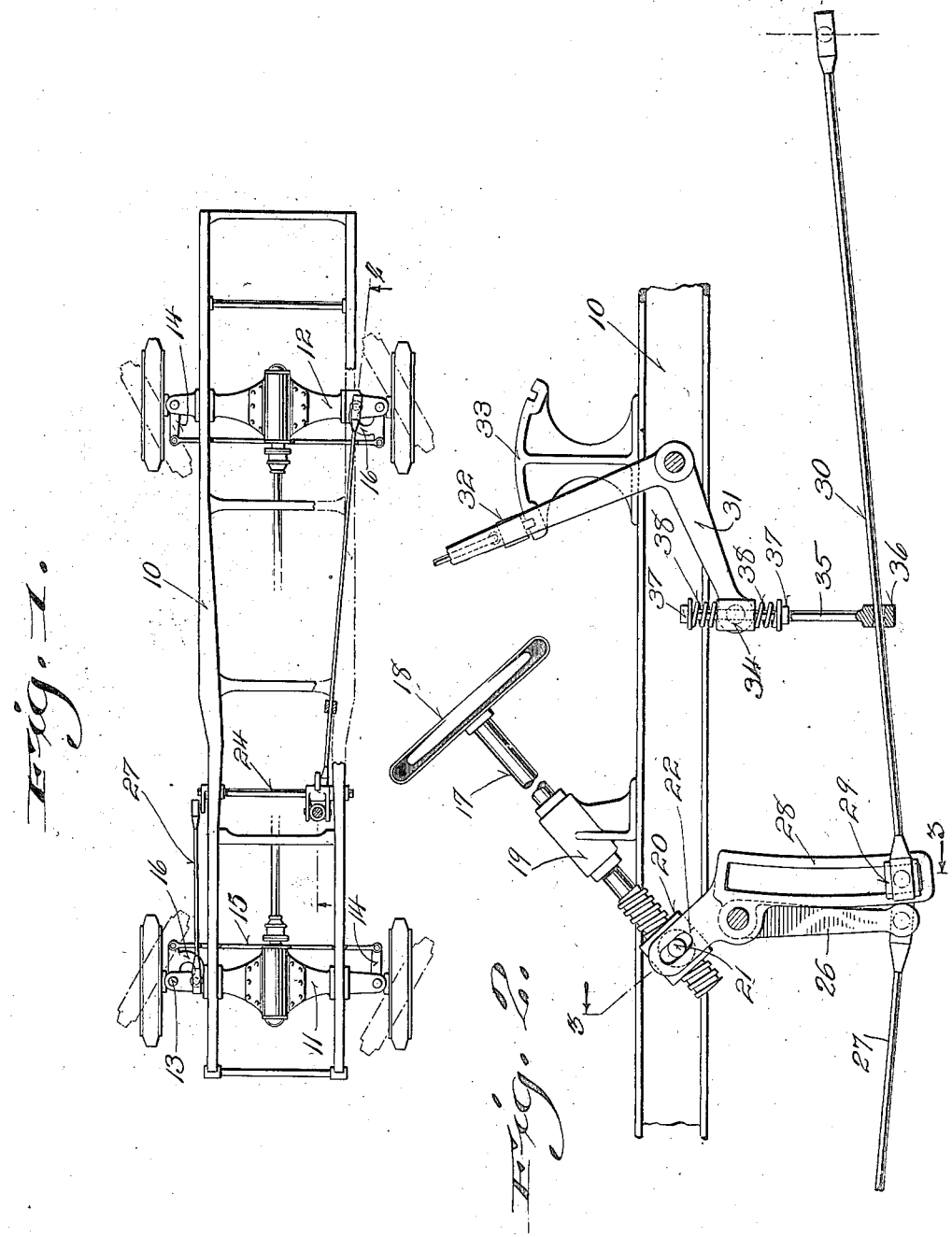
WITNESSES:
INVENTOR
David S. Stewart
BY
ATTORNEY

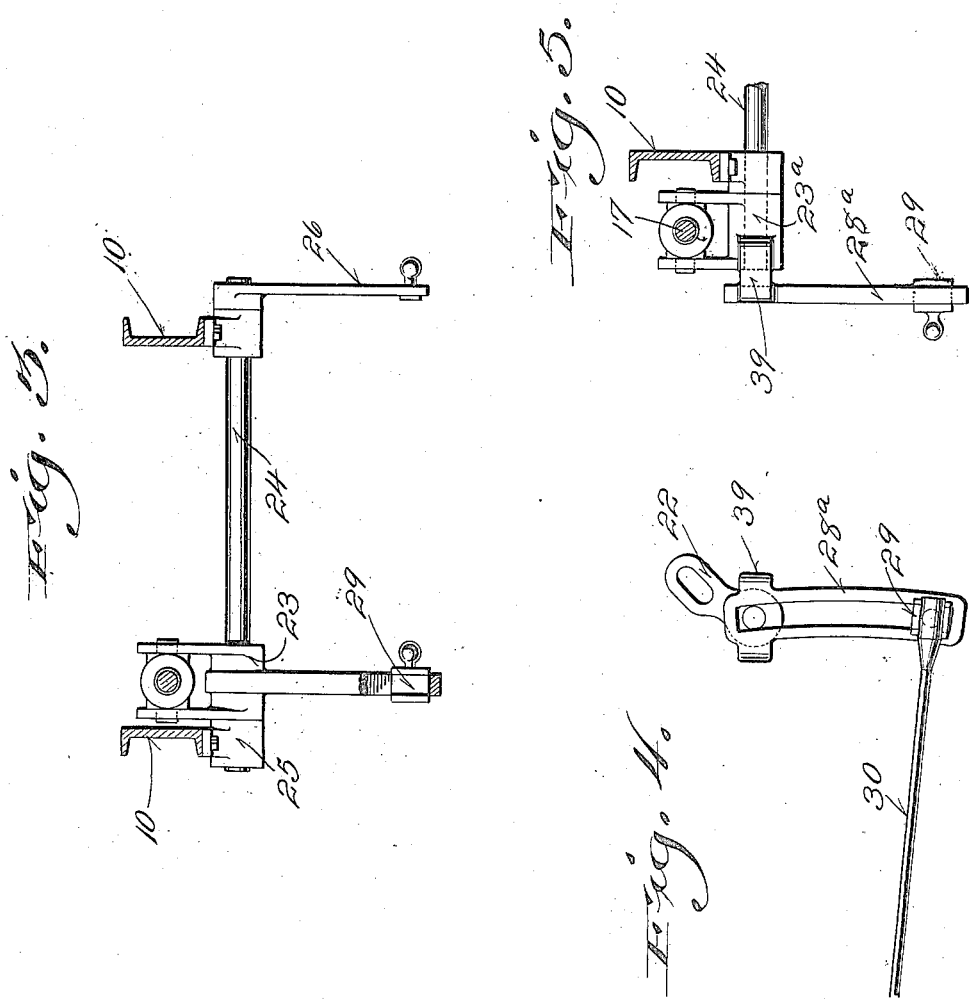

UNITED STATES PATENT OFFICE.

DAVID S. STEWART, OF APPLETON, WISCONSIN, ASSIGNOR TO ANTIGO TRACTOR CO., OF ANTIGO, WISCONSIN, A CORPORATION OF WISCONSIN.

FOUR-WHEEL STEERING-GEAR.

1,323,653.  Specification of Letters Patent.  Patented Dec. 2, 1919.

Application filed January 20, 1919. Serial No. 272,121.

*To all whom it may concern:*

Be it known that I, DAVID S. STEWART, a citizen of the United States, and resident of Appleton, in the county of Outagamie and State of Wisconsin, have invented certain new and useful Improvements in Four-Wheel Steering-Gears; and I do hereby declare that the following is a full, clear, and exact description thereof.

My invention relates to new and useful improvements in the steering gear of four wheel drive vehicles of that type wherein each of the wheels is adapted for steering movement.

It is in general the object of my invention to provide an arrangement of maximum simplicity and efficiency whereby the rear wheels may selectively be placed under the influence of the steering mechanism of the vehicle or may be held against movement thereby.

A further object resides in the provision of a steering mechanism of this type which is adapted for use with the conventional wheel structures including steering spindles carried by rigid front and rear axles.

A still further object resides in the provision of a mechanism of this character which may be most readily operated.

With the above and other objects and advantages in view, which will be apparent as the description proceeds, my invention resides in the novel features of construction, combination and arrangement of parts as hereinafter more particularly described and defined by the appended claims.

In the accompanying drawings:

Figure 1 is a plan view of a four wheel drive vehicle chassis having my improved steering mechanism associated therewith.

Fig. 2 is a vertical sectional view through the intermediate portion of the chassis.

Fig. 3 is a sectional view taken transversely through the chassis on planes indicated by the broken line 3—3 of Fig. 2.

Fig. 4 is a side elevational view of a modified form of a rock shaft connection.

Fig. 5 is a front elevational view of said modified connection.

Referring now more particularly to the accompanying drawings, there is shown an automobile chassis including the side sills 10 which carry the front and rear axles 11 and 12 respectively having the front and rear steering wheel spindles 13 and 14 pivoted to the outer end portions, the usual arms 14 extending inwardly from each spindle, and the front and rear arms 14 being connected by the rods 15 in the usual manner. One arm 14 of each pair of spindles carries a portion 16 extending inwardly transversely of the chassis and these arm portions are preferably disposed at opposite sides of the chassis.

An inclined steering shaft 17 carrying a wheel 18 is journaled in a bearing 19 on the chassis and has a nut block 20 threaded on its lower end portion, said nut block being provided with pintles 21 mounted in slots formed in rock arms 22 projecting upwardly from a sleeve 23 fixed on a rock shaft 24 extending transversely at the front portion of the chassis and journaled in bearings 25 depending from the side sills 10. As shown particularly in Fig. 1, the steering shaft 17 and associated structure is disposed at the side of the chassis remote from the steering arm extension 16 of the front axle structure. The end of the rock shaft 24 adjacent this arm 16 is provided with a depending crank arm 26 having universal connection with a link 27 universally connected in turn with the steering arm portion 16 whereby upon rocking movement of the shaft 24 due to rotation of the steering wheel 18, the front wheels will be swung in the usual manner.

To provide a connection between the rock shaft 24 and the steering arm portion 16 of the rear axle, which connection may be rendered operative or inoperative at the will of the operator, a slide arm 28 depends from the sleeve 23, being thus disposed at the side of the chassis remote from the crank arm 26. This slide arm is longitudinally slotted to receive a block 29 which has universal connection with a link 30 connected in turn with the steering arm portion 16 of the rear axle structure. It is thus noted that the upper limit of movement of the block 29, as defined in the present structure by the top of the slot, is immediately rearwardly of the rock shaft 24, while the lower limit of movement of the block is at a point spaced from the axis of the rock shaft 24 a distance equal to the spacing of the pivot axis of the crank arm 26 from said shaft. Thus, when the block is at its lower limit of movement, rocking motion of the shaft 24 will impart equal steering movements to the front and rear pairs of wheels, while when the block 29 is at its upper limit of movement, rocking motion of the shaft 24 will impart full steering movement to the front wheels, but will impart an entirely inconsiderable degree of movement to the rear wheels. The slide arm 28 is curved concentric with the pivotal connection of the link 30 and rear steering arm portion 16, whereby swinging movement of the link will not affect the rear wheels. The block 29 and consequently the link 30 is selectively moved to and held in its various limits of movement by an angle lever 31 pivoted to the adjacent chassis sill 10, one end of the lever extending upwardly to form a handle and carrying a pawl 32 engageable with a notched segment 33 on the sill 10, while the other arm of the lever has its free end bifurcated to pivotally receive a block 34 in which is slidably mounted a rod 35 having a head 36 at its lower end apertured to loosely receive the link 30. Stop members 37 are disposed on the rod 35 above and below the block 34 and springs 38 are mounted on the rod between the block and said stop members to provide a yieldable holding of the link 30 in either of its limit of movement, it being noted that the stresses incidental to steering movement of the link are imparted transversely of the slide arm 28 and hence would not be imparted to said spring.

Thus by swinging the lever 31 the link 30 may be selectively positively held in either raised or lowered position to thus procure steering movement of the rear wheels simultaneously with steering movement of the front wheels, or to hold the rear wheels against steering movement independently of manipulation of the front wheels. Figs. 4 and 5 illustrate a slightly modified structure whereby the pivotal connection of the link 30 with the slide arm may be moved to the exact center of the rock shaft 24 to thus prevent any movement whatever of the link 30 upon rocking movement of the shaft to manipulate the front wheels. In this structure, a rock sleeve 23$^a$ similar to the sleeve 23 is carried on the shaft 24 outwardly of the side sill 10, the sleeve thus extending to the end of the shaft, and arms 39 are projected outwardly of the sleeve which carry a depending slide arm 28$^a$ in which the block 29 of the link 30 is mounted, the slot of said arm 28$^a$ extending above the axis of the shaft.

It will be appreciated that various changes and modifications of structure may be employed to meet different described conditions without departing in any manner from the spirit of my invention, the essential feature of which resides in the provision of a connection between the main steering mechanism and the rear axle structure which is shiftable to selectively utilize or avoid the steering movement of said mechanism.

What is claimed is:

1. The combination with a vehicle including a pair of dirigible wheels, of a steering mechanism including a rock shaft, an arm on said shaft, a link slidably connected with said arm and connected with the wheels, a lever pivoted to the vehicle and a member connected with the link and pivotally connected with said lever for holding the link in various positions on the rod.

2. The combination with a vehicle including a pair of dirigible wheels, of a steering mechanism including a rock shaft, an arm on said shaft, a link slidably connected with said arm and connected with the wheels, a lever pivoted to the vehicle, a rod slidably connected with the lever and having an apertured head portion slidably receiving the link, and means resiliently opposing sliding movement of the rod with respect to the lever.

3. The combination with a vehicle including a pair of dirigible wheels, of a steering mechanism including a rock shaft, an arm on said shaft, a link slidably connected with said arm and with the wheels, a lever pivoted to the vehicle, a block pivotally carried by the lever, a rod slidably mounted in the block and having a head portion slidably receiving the link, and means resiliently opposing sliding movement of the rod with respect to the block.

4. The combination with a vehicle including a pair of connected steering knuckle spindles, of a steering mechanism including a rock shaft, an arm on the rock shaft, a block slidably carried by the arm, a link having pivotal connection with the block and with one of the steering knuckle spindles, and means for holding said block in different positions on the arm.

5. The combination with a vehicle including front and rear pairs of steering spindles, the spindles of each pair being connected, of a steering mechanism including a rock shaft journaled transversely of the vehicle, a depending arm on the rock shaft at one side of the vehicle, a link connecting said arm with one pair of steering spindles, a depending arm on the rock shaft at the other side of the vehicle, a link having one end slidably connected with said last named arm, said link being connected at its other end with the other steering spindles, and means for holding the link in different sliding positions on the arm.

6. The combination with a vehicle including a pair of dirigible wheels, of a steering mechanism including a rock shaft, a link connected with said wheels for steering the wheels upon longitudinal movement of the link, and means connecting the link and rock shaft for selectively holding the link adjacent the center of said shaft, or remote from the center of said shaft.

In testimony that I claim the foregoing I have hereunto set my hand at Milwaukee, in the county of Milwaukee and State of Wisconsin.

DAVID S. STEWART.